May 26, 1931. G. E. STOCKING 1,806,957
APPARATUS FOR WASHING VEGETABLES AND FRUITS
Filed Aug. 8, 1928  2 Sheets-Sheet 2

INVENTOR.
George E. Stocking,
BY Morsell, Keeney & Morsell
ATTORNEYS

Patented May 26, 1931

1,806,957

UNITED STATES PATENT OFFICE

GEORGE E. STOCKING, OF ROCHELLE, WISCONSIN, ASSIGNOR OF ONE-FOURTH TO BERLIN CHAPMAN COMPANY, OF BERLIN, WISCONSIN, A CORPORATION OF WISCONSIN

APPARATUS FOR WASHING VEGETABLES AND FRUITS

Application filed August 8, 1928. Serial No. 298,287.

This invention relates to improvements in apparatus for washing vegetables and fruit, and is more particularly adapted for use in cleaning asparagus.

Heretofore asparagus has been washed by hand, the said method of cleaning being slow, tedious, and inefficient, sand and grit frequently being left beneath the petals.

It is one of the objects of this invention to provide an apparatus for and method of washing asparagus with the use of a machine by means of which all foreign matter is efficiently removed.

A further object of this invention is to provide an apparatus for washing asparagus which will not break off the tender heads or otherwise injure the produce.

A further object of this invention is to provide an apparatus for and method of washing asparagus in which warm water is used for the purpose of shrinking and separating the petals, so as to permit the sand and dirt to be readily removed from underneath said petals.

It is a further object of this invention to provide an apparatus for and method of washing vegetables and fruits which is simple and well adapted for the purpose described.

With the above and other objects in view, the invention consists of the improved apparatus for and method of washing vegetables and fruits and all its parts and combinations as set forth in the claims, and all equivalents thereof.

In the accompanying drawings, in which the same reference characters designate the same parts in all of the views.

Figure 2:
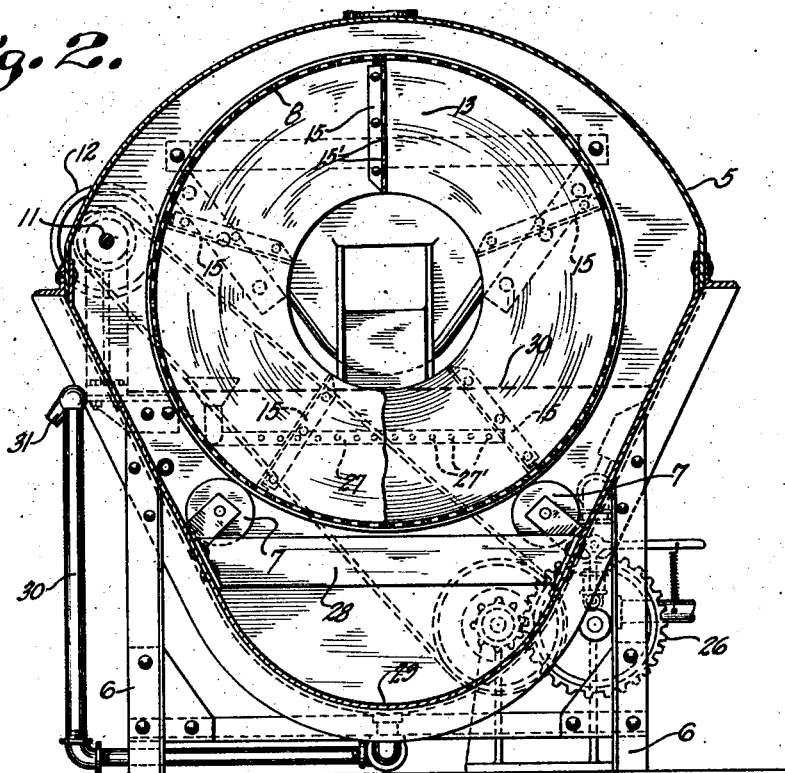
Fig. 2 is a sectional view taken on line 2—2 of Fig. 1.
Figure 3:
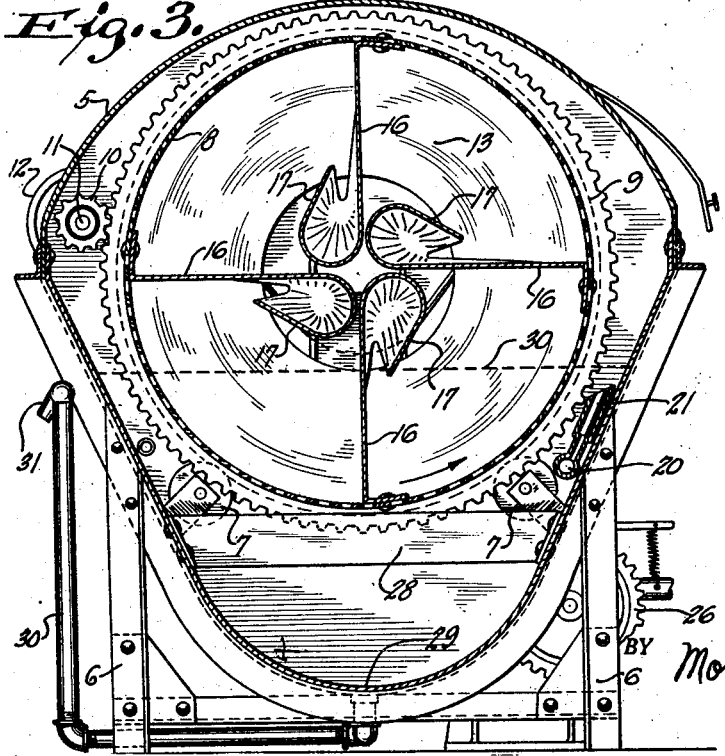
Fig. 3 is a sectional view taken on line 3—3 of Fig. 1.

Referring more particularly to the drawings, the numeral 5 designates a drum or receptacle which is substantially egg-shape in cross-section, as will be clear from Figs. 2 and 3, and which is supported in any suitable manner as by legs 6. Rotatably mounted upon rollers 7, within the drum 5, is a foraminous inner drum or cylinder 8 having end perforations and which is provided upon its exterior surface with an annular gear 9. Said gear meshes with a pinion 10 which is carried by a longitudinal shaft 11 and said shaft projects through one end of the outer drum or container 5, and carries a pulley 12 by means of which it may be driven from any suitable source of power (not shown).

The said rotatable drum 8 is provided on its inner side with a spiral flange or flight 13 which is secured to the inner circumference of the drum 8 in any suitable manner, and which serves to feed the asparagus or vegetables or fruit, which are introduced into the interior of said drum 8 through a feeding hopper 14, toward the other end of said drum.

Positioned between the convolutions of the spiral 13, at various points, are a plurality of baffle plates 15 having perforations 15' therein. The baffle plates are provided with flanged sides, by means of which the plates are secured between adjacent convolutions of the spiral 13. These baffle plates constitute one of the important novel features of the invention, as they provide means for lifting the asparagus stems from the water used within the device, and for dropping them into the water upon each revolution of the spiral.

Figure 1:
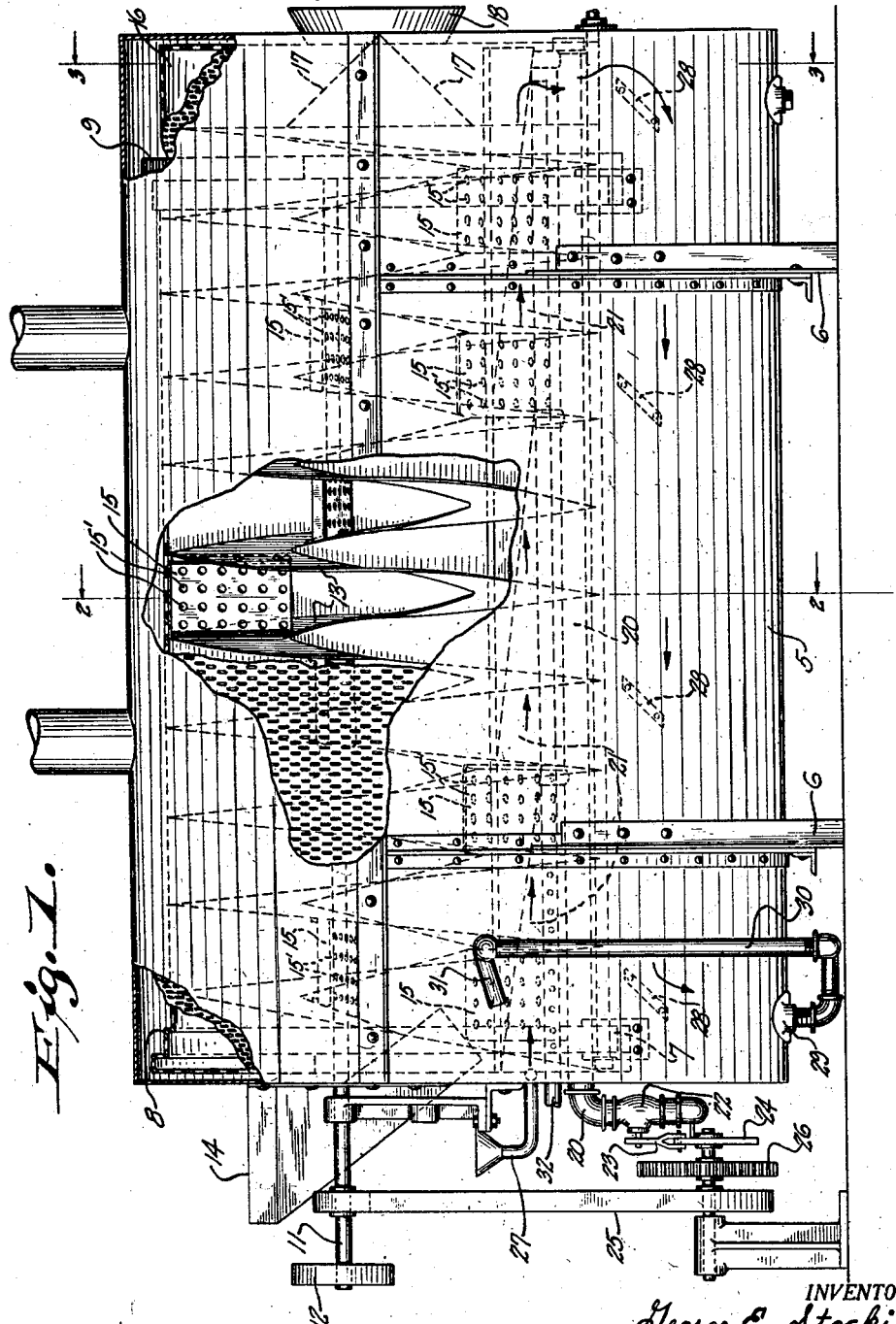
Fig. 1 is a side elevational view of the improved apparatus.

The drum 8, at its right hand end, as viewed in Fig. 1, is provided with a plurality of radially extending plates 16, the inner ends of which are preferably reversely curved, as at 17, to receive and discharge from the drum, the asparagus or other vegetables or fruit. The said reversely bent portions 17 act as discharging buckets to collect said vegetables or fruit, and discharge the same through an outlet opening 18 provided at the right hand end of the outer drum or container 5, as will be clear from Fig. 1.

A skimming pipe 20 extends longitudinally within the container 5 and outside of the drum 8 and is provided with a plurality of enlarged skimming hoppers 21 which extend above and drain into the pipe 20, as will be clear from Fig. 1, to receive the scum from the surface of the water. Said hoppers extend substantially the entire length of the drum and their upper open portions are approximately in alinement with the surface of water within the drum. The said pipe 20 is intermittently opened to receive the flow of scum and the opening is controlled by a valve 22 which may be automatically actuated through the spring retrieved valve lever 23 and a rotating cam 24 which cam is driven through the belt 25 and gears 26 from the shaft 11, as will be readily understood. By the provision of the intermittent flow, the scum will be more efficiently caused to flow into the openings of the hoppers 21 from all portions of the surface of the water, as the intermittent movement will continually change the direction of flow. Furthermore the direction of rotation of the drum will tend to move the scum towards the hoppers and, as shown in Fig. 3, the lower portion of each hopper inlet opening extends a slight distance below the surface line of the water within the tank to permit the free entrance of the scum.

Water is supplied to the drum through the pipe 27 which extends through the outer drum and along the end wall of the drum and is formed with openings 27' to direct the flow of water towards the opposite end of the drum, as indicated by the arrows in Fig. 1. As thus directed the flow of the upper portion of the water will be towards the opposite end of the drum while the flow of the lower portion of the water will be in the opposite direction, as indicated by the said arrows. In flowing in the opposite direction the water will be deflected downwardly by the angularly disposed transverse members 28 and move any sludge settling in the bottom portion of the tank towards the discharge opening 29 of the discharge pipe 30. Said pipe extends outwardly and upwardly to a point approximately on a level with the surface of the water within the drum and is formed with a hinged end part 31 to adjust the level of said surface. The water is heated by steam from a perforated pipe 32 which extends into the outer drum longitudinally of its length and below the level of the surface of the water.

In use, the asparagus, or other vegetables or fruit, is introduced into the inclined feeding hopper 14, from which it is fed into the interior of the foraminous drum, as above described, the said drum being rotated through the shaft 11 and the gears 9 and 10. The food product will be fed longitudinally through the drums 8 by means of the threaded action of the spiral of the flange 13, and will be subjected to the effect of the steam sprayed hot water which flows into the interior of the container 5 from the water pipe 27. With each revolution of the spiral the asparagus or other food is lifted out of the water within the drum by one of the baffle plates 15, is carried around by said plate, and is again dropped into the water. By thus providing the baffle plates, the produce is carried in and out of the water and is thoroughly cleansed without impairing it in any way.

As the food product approaches the right hand end of the apparatus, as viewed in Fig. 1, the particles of sand, dirt, or other foreign matter which has been separated from the vegetables or fruit, will be worked out of the perforations of the inner drum by rotation of said drum, and by the flow of the water which fills the container up to substantially the level indicated by the dotted line 30 in Figs. 2 and 3, and will be discharged from the outer drum by means of the hopper members 21, and through the discharge pipe 30. The vegetables or fruit will be discharged from the end of the spiral flight by means of the bucket members 17. During the operation the automatic valves 22 will be turned on and off to intermittently discharge the scum from the surface of the water by means of the cam and spring retrieved levers 24 and 23.

A novel feature of this invention, when used in cleaning asparagus, resides in the use of sufficiently hot water to shrink and separate the petals of the asparagus so as to permit the sand and dirt to be readily removed from underneath said petals.

Although the apparatus and method are more particularly adapted to the washing of asparagus, it is not desired to be so limited, as other vegetables or fruits may be very efficiently cleaned by the apparatus and method described herein.

By using the apparatus without water it is possible to scarify and polish vegetables and fruit in a very efficient manner.

From the foregoing description it may be seen that the improved apparatus for and method of washing vegetables and fruit is simple and well adapted for the purpose described.

What I claim is:

1. An apparatus for treating food material comprising an outer water holding receptacle, a foraminous drum rotatably mounted in said receptacle and having an opening for receiving food material, spiral means for moving said materials through said drum, and lifting members carried by convolutions of said spiral, each of said lifting members in one position being entirely clear of the water in the outer receptacle, and in another position being entirely submerged therein to enable said lifting members to carry the food material in and out of the water as the material is being moved through the drum.

2. An apparatus for treating food material comprising an outer water holding receptacle, a foraminous drum rotatably mounted in said receptacle and having an opening for receiving food material, spiral means for moving said material through said drum, and perforated lifting members carried by convolutions of said spiral, each of said lifting members in one position being entirely clear of the water in the outer receptacle, and in another position being entirely submerged therein to enable said lifting members to carry the food material in and out of the water as the material is being moved through the drum.

3. An apparatus for treating food material comprising an outer water holding receptacle, a foraminous drum rotatably mounted in said receptacle and having an opening for receiving food material, spiral means for moving said material through said drum, and lifting members carried by convolutions of said spiral, the lifting member of one convolution being staggered with relation to the lifting members of adjacent convolutions, each of said lifting members in one position being entirely clear of the water in the outer receptacle, and in another position being entirely submerged therein to enable said lifting members to carry the food material in and out of the water as the material is being moved through the drum.

In testimony whereof, I affix my signature.

GEORGE E. STOCKING.